Feb. 15, 1955
C. A. CLOCK
2,702,160
PRESSURE AND BELLOWS-OPERATED RELEASE VALVE
Filed April 5, 1954
2 Sheets-Sheet 1
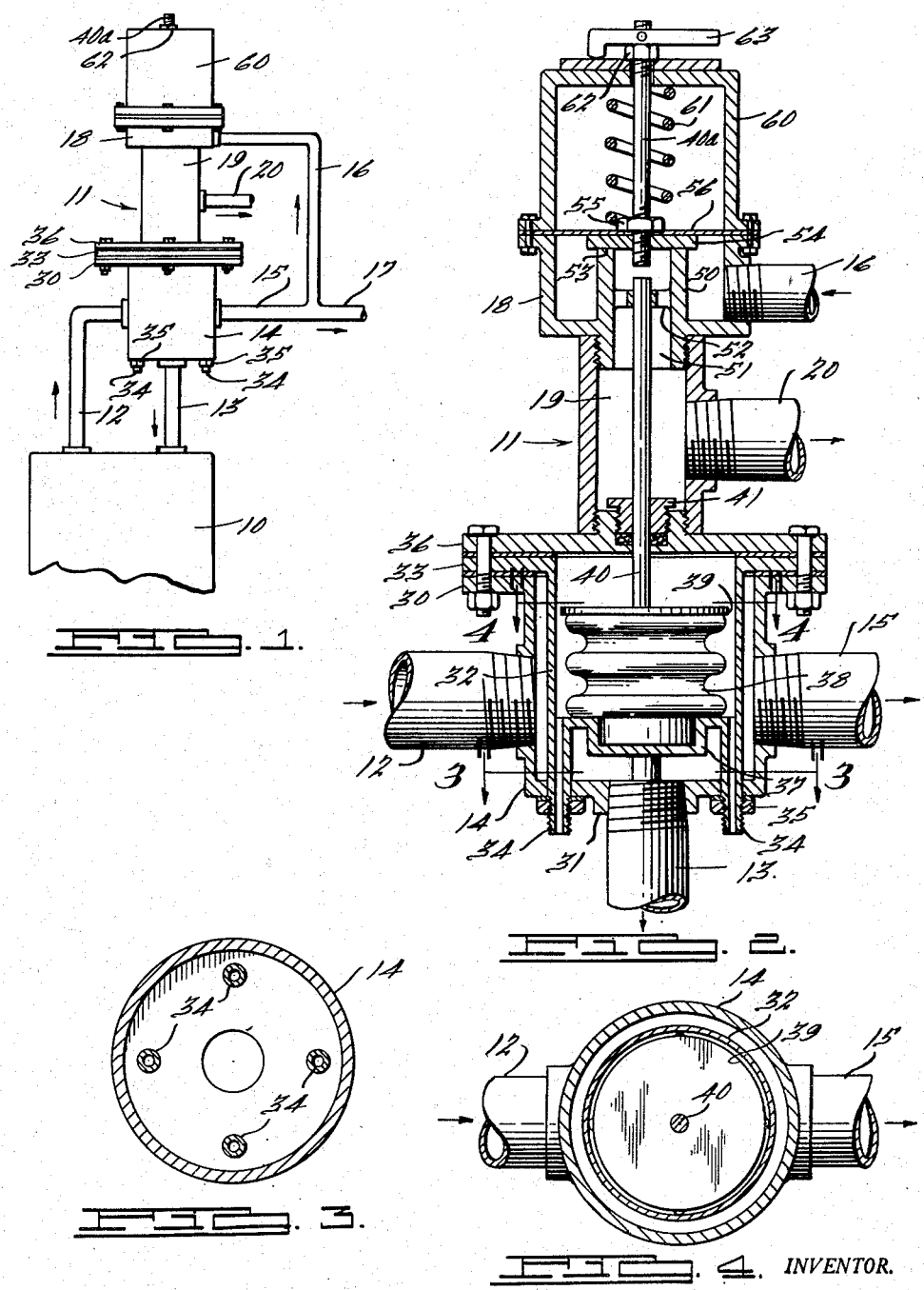
INVENTOR.
Charles A. Clock
BY
Harness, Dickey & Pierce
ATTORNEYS

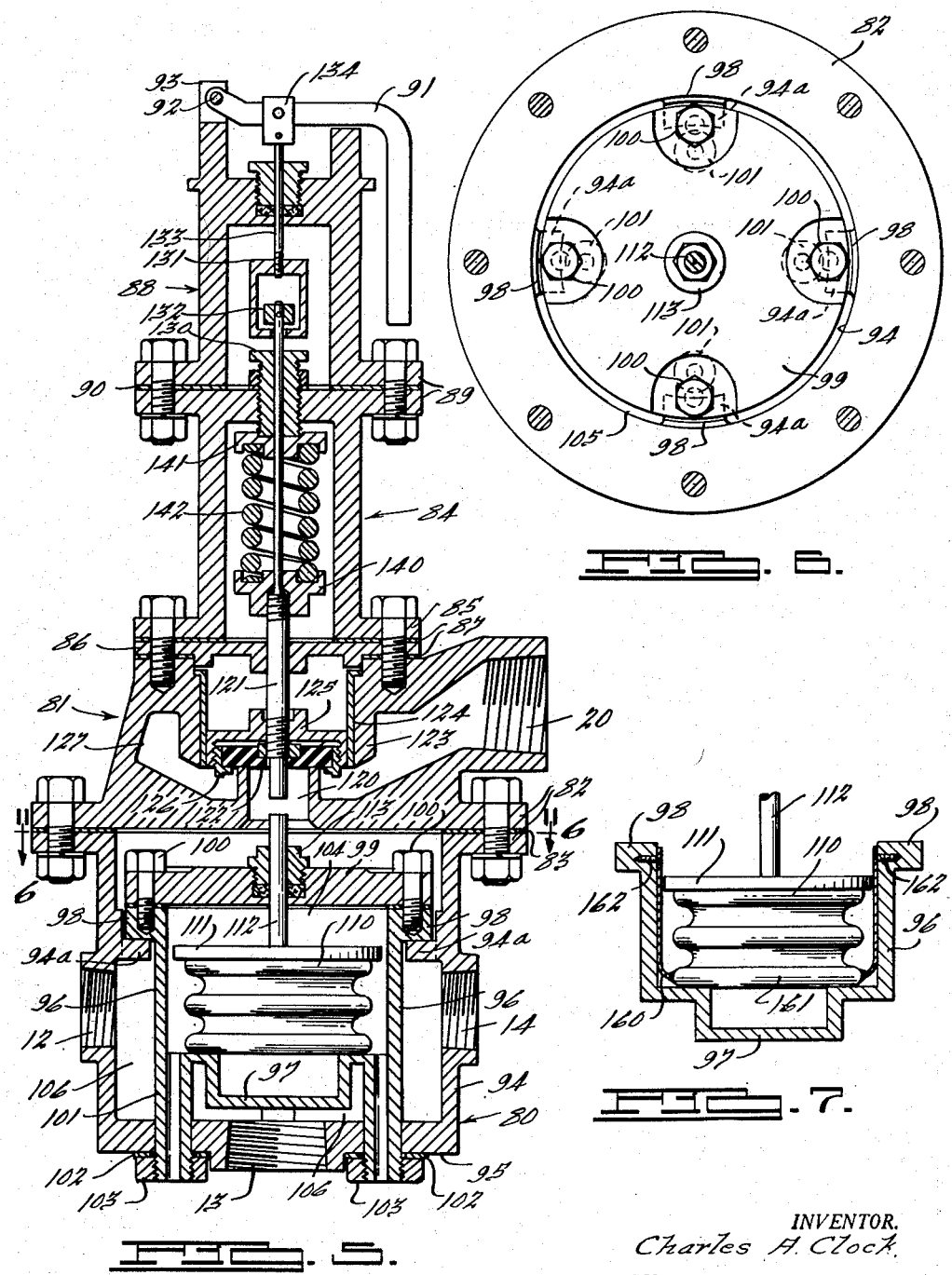

United States Patent Office 2,702,160
Patented Feb. 15, 1955

2,702,160

PRESSURE AND BELLOWS-OPERATED RELEASE VALVE

Charles A. Clock, Detroit, Mich.

Application April 5, 1954, Serial No. 421,076

3 Claims. (Cl. 236—92)

This invention relates to relief valves for use in water-filled systems. More particularly, the invention relates to relief valves having both pressure- and temperature-responsive elements to protect water-filled systems against extremes of both pressure and temperature.

In various types of water-filled systems such as hot water space heating systems and hot water heating tanks, it is necessary for complete safety to control both the pressure and temperature. For example, most home-type hot water tanks are protected only by temperature-responsive elements controlling heat input. Others are manually operated with no temperature safety device. Should the tanks be neglected or the heat controls be out of order, a dangerous condition soon develops due to uncontrolled rise in temperature and pressure. In other installations, auxiliary coils inserted in the firepots of heating furnaces are used, in which case the heat input cannot be controlled. In most hot water space heating systems, especially those which are hand fired, the temperature of the water is regulated merely by manipulation of dampers and control of fuel addition while pressure is maintained by manual manipulation of water input valves. In these systems, neglect in firing or failure of safety devices can produce dangerous pressures in a very short time. When this happens, damage to water meters is possible by blow-back into water mains. If check valves are present, high pressures can lead to explosions and damage to buildings and equipment.

It is a principal object of this invention, therefore, to provide a simple safety device which will protect water-filled systems against extremes of both temperature and pressure.

It is a more specific object of this invention to provide a simple water-relief valve incorporating both temperature- and pressure-responsive elements, which valve is easily inserted in external pipelines yet which permit constant circulation of water from the system in contact with the temperature-responsive element, even when water is not being drawn through the valve.

Another object of this invention is to provide a simple water-relief valve which is sensitive, inexpensive to manufacture, and easy to install.

Still another object is to provide a water-relief valve which can utilize temperature-responsive bellows operating at low pressures by virtue of the utilization of line pressure to overcome the efforts of the pressure-responsive element.

Yet another object of this invention is to provide a simple water-relief valve having both temperature- and pressure-responsive elements acting on a common valve stem and actuating a single discharge valve.

Still other objects and advantages of the invention will become apparent in the following description of the invention taken in conjunction with the accompanying drawings, of which:

Fig. 1 is a schematic elevational view showing an illustrative use of the relief valve of this invention;

Fig. 2 is a sectional elevational view taken through the center of the relief valve of this invention;

Fig. 3 is a sectional view of the base of the water relief valve of this invention, showing in particular the atmospheric bellows vent tubes, the section being taken along the line 3—3 of Fig. 2;

Fig. 4 is a sectional view of the valve of Figs. 1 to 3, showing in particular the nature of the bellows;

Fig. 5 is an elevation in section of a second embodiment of the valve of this invention, showing in particular the use of an enlarged discharge valve;

Fig. 6 is a cross sectional view of the valve of Fig. 5, the section being taken along the line 6—6 of Fig. 5; and Fig. 7 is an enlarged fragmentary elevational view, partially in section, showing a second mode of mounting the temperature-sensitive bellows.

Referring now to Fig. 1 of the drawings, it will be seen that the illustrative water system comprises either a hot water tank or hot water boiler 10 on which the valve 11 of this invention is mounted. Two water inlet pipes 12, 13, the latter extending to a lower region of tank or boiler 10, and a single water outlet line 15 are connected to the base 14 of the valve. The line 15 has a T-fitting into which are fitted a vertical line 16 and a horizontal water outlet pipe 17. The vertical pipe line 16 is connected to the valve chamber or section 18 of the valve 11. At the middle section 19 of the valve 11 there is provided a relief or waste discharge line 20. Water may be withdrawn through final outlet pipe 17 to supply a hot water tap or hot water radiator. When no water is being drawn by the system through line 17, circulation of water through the valve base is maintained, for example, in the direction of the arrows through lines 12, 13. Since the base of the valve contains the temperature-responsive element, the importance of the by-pass piping arrangement is readily seen, the latter element will always be maintained in contact with water at the temperature obtaining in the tank or boiler 10. Connection with the pressure-responsive element contained in the valve section 18 is maintained through vertical line 16. Water will be discharged by either or both the temperature- or pressure-responsive elements through relief line 20.

The interior mechanism of the valve appears in Fig. 2. The base 14 of the valve is composed of a cylindrical outer wall 14 having flanged edges 30 and a bottom 31. Fitting inside the wall 14 is a cylindrical bellows chamber 32, likewise having an upper flange 33 and having extending from its bottom four small atmospheric vent tubes 34. The tubes 34, 34 are extended through tube bottom member 31, screw threads, gaskets and nuts 35, 35 being provided for a water-tight seal. The valve base 14 and bellows chamber 32 are bolted to the flange 36 of the middle section 19 of the valve, resilient gaskets being provided to insure a leak-proof joint.

The bellows chamber 32 is cylindrical in shape. Its bottom wall is surrounded by water and shaped in the form of a bellows-retaining cup 37 into which is fitted the base of a corrugated bellows 38, for example, of the "Sylphon" type. The bellows 38 is filled with a volatile liquid having a suitable boiling point, preferably below the boiling point of water. Attached to the top of the bellows is a solid metal plate 39 to which is attached a lower valve stem 40. The lower valve stem 40 passes through a packing gland 41 and into the interior of the middle or discharge chamber 19. The bellows 38 is thus sealed in a chamber vented to the atmosphere through vent pipes 34, 34. The walls of the bellows cup 37 being in intimate heat exchange relationship with the jacket water make for especially efficient heat transfer to the liquid inside the bellows. The bellows 38 mounted in this manner quickly responds to variation in the temperature of the water circulating through pipes 12, 13 and 15 and in the space between valve base 14 and the bellows chamber 32.

The middle or discharge chamber 19 contains the discharge port or pipe 20. At the top interior edge of the middle section 19, the valve section 18 is screwed in to insure a tight fit. In the center of the valve chamber 18 a circular wall 50 defines an open-ended passageway 51 connecting with discharge chamber 19. In the passageway 51 and forming an integral part of wall 50, there is provided a valve stem support 52. The upper edge of wall 50 forms a valve seat 53 on which is seated a valve member 54 of metal or a heat-resistant resilient material. The valve member 54 is secured to an upper valve stem section 40a by a threaded nut 55. A thin flexible membrane 56 is interposed between valve member 54 and nut 55. The valve member 54 can be adhesively secured to the membrane 56 or can be integral therewith, if desired. The membrane 56 could be replaced by a larger valve member 54 if the diameter of wall 50 is increased and direction of flow in pipes 16 and 20 is reversed in order to introduce full line pressure under the enlarged valve member itself. In this modification, line pressure also could assist in lifting the valve member off the valve seat.

Above the chamber 18 there is attached a flanged valve bonnet section 60. As will be seen the valve stem 40 is not continuous but is broken in the area between valve guide 52 and valve member 54 so as to have a lower section 40 and an upper section 40a. This space permits fluctuations in the height of the bellows 38 caused by cooling and warming up and minor variations in water temperature below the discharge setting of the bellows. The length of stem 40a enclosed in bonnet 60 is surrounded by a compression spring 61. A nut 62 threaded on the outwardly extending end of stem 40a governs the compression applied to spring 61 and for that reason the pressure applied to valve member 54. With this arrangement, tightening or backing off of nut 62 will vary the pop-off or discharge pressure necessary to raise valve member 54 off valve seat 53. As shown, a pivoted manual test handle 63 is provided on the top end of valve stem section 40a for periodic freeing and testing of the valve.

In operation, the valve described operates as follows. If the pressure in tank 10 exceeds the pop-off value, water entering through line 16 raises valve member 54 off the valve seat 53 and water escapes through passageway 51 into discharge chamber 19 and out waste discharge line 20. The membrane 56 facilitates the lifting of valve member 54 because of its relatively large surface area exposed to line pressure, such pressure being exerted under the membrane 56 counteracts the compressive force of spring 61. The membrane 56 also assists the temperature-responsive bellows 38 in lifting the valve member 54. Suppose the water in tank or boiler 10 exceeds the temperature at which bellows 38 is set to operate. When this happens, water circulating through the space between the walls of the valve base 14 and the bellows chamber 32 heats bellows 38 causing it to increase in height and raise lower valve stem section 40 until it makes contact with upper valve stem section 40a. The bellows, therefore, exerts an upward lifting force against valve stem 40a. At the same time, whatever pressure is obtaining in tank or boiler 10 is being exerted under membrane 56 in such a way to cancel out a substantial portion of the force applied by spring 61. Bellows 38, therefore, need only exert a small force to raise valve member 54 off seat 53. When this is done, water passes under the valve member, through passageway 51 and discharge chamber 19 and out discharge line 20. In most cases, bellows 38, the temperature-responsive element, and membrane 56, the pressure-responsive element, cooperate in the opening and closing of valve 54. Bellows 38, however, can act independently to discharge hot water even though the pressure in the system is insufficient to operate membrane 56. Likewise, if high pressure is applied to tank 10, membrane 56 will relieve such pressure even though the water temperature is insufficient to operate bellows 38.

As will be seen from the above description, the bellows 38 does not have to overcome the entire pressure applied by spring 61. Moreover, since bellows 38 is sealed in a chamber vented to the atmosphere, it is not acted upon by line pressure. Bellows 38, therefore, can be of much lighter and less expensive construction. Its action is quicker due to its having a portion of its bottom, wherein is contained its volatile liquid, in intimate heat-exchange relationship with the cup-shaped bellows chamber wall 37. The bellows cannot be corroded by action of the water. Should the packing gland 41 leak, the water is immediately removed through vent tubes 34, 34. In the valve of this invention, the absence of direct mechanical connection between the valve member 54 and pressure responsive membrane 56 on the one hand, and the bellows 38, on the other, prevents damage to the latter. The relief valve of this invention is easily serviced without removal from the piping connections. Valve bonnet 60 is easily removed for inspection and replacement of the spring, membrane and valve member and for refacing of the valve seat.

A second embodiment of the relief valve of this invention is shown in Figs. 5 to 7. This valve is intended to be used in a piping arrangement similar to that of Fig. 1. In this valve, there are two main body portions, a base 80 and a valve chamber 81. These latter chambers are bolted together to form a water-tight seal by flanges 82, 82 and a gasket 83. Above valve chamber 81, a third chamber 84 is attached by a flange 85, a valve stem guide plate 86, and gaskets 87, 87. A top bonnet section 88 is mounted atop chamber 84 by means of flanges 89 and a gasket 90. A valve handle 91 is mounted atop bonnet 88 and pivoted on a pin 92 held in an upstanding bracket 93.

The valve base 80 is a cylindrical cup-shaped chamber having an outer wall 94 and an integral bottom 95. The wall 94 has four inwardly projecting lugs 94a, 94a in its inner side. Three water ports enter the valve base 80, in this instance indicated by the same numerals as are applied to the pipes in Figs. 1 and 2, respectively, 12, 13 and 14. Inside valve base 80 there is fitted an annular-shaped member having a continuous cylindrical side wall 96, cup-shaped bottom wall 97, four outwardly-projecting lugs 98, 98 adapted to rest on lugs 94a, 94a, and a top plate 99 having four holes for attachment to lugs 98, 98 by means of bolts 100, 100. From the bottom wall 97, four vent tubes 101, 101 are extended to pass through the valve base bottom 95, gaskets 102, 102 and nuts 103, 103 being provided to tightly seal the vent tubes 101, 101 to outer wall 95. Thus provided, the valve base section 80 incorporates an annular water jacket 106 completely surrounding a sealed bellows chamber 104, the latter being vented to the atmosphere through vent tubes 101, 101. Water enters any of the three inlet openings 12, 13 and 14 and circulates around the water jacket just described. Water can flow upwardly through space 105 (see Fig. 6) to reach the valve chamber 81, as will be more fully explained below.

A bellows 110 is attached at its top by soldering or brazing to a top plate 111. Attached to plate 111 is a lower valve stem section 112. The valve stem 112 passes through a hole in the upper plate 99, through a packing gland 113 provided to prevent leakage of water into bellows chamber 104. If water does leak through the gland 113, it is immediately removed through vent pipes 101, 101.

The lower valve stem section 112 passes upwardly into the throat 120 of valve chamber 81 where it terminates just short of an upper valve stem section 121. The walls of throat 120 are upstanding to form a seat for a valve member 122 which is screwed on valve stem 121. Valve chamber 81 is provided with a depending circular wall 123 having a replaceable inner liner 124. Also attached to valve stem 121 is a circular slide guide 125 having internal threads to receive a valve-retaining collar 126. The slide 125 fits so snugly in liner 124 as to make unlikely the passage of any water into upper valve chambers 84, 88. If such leakage does occur, however, it can occur only during an open position of the valve 122, since discharge chamber 127 normally is only partially full of water during the normally closed position of valve 122. When the valve 122 is reseated again, any water having entered chambers 84, 88 will drain out again. Water enters the throat 120 from water jacket space 106 through the annular space 105 and reaches the valve 122. If the water pressure or temperature is too great, the valve 122 will be lifted to discharge water into chamber 127 and out discharge opening 20.

The upper valve stem section 121 extends vertically through chamber 84, through a supporting guide member 130 screwed between chambers 84 and 88, and finally terminating inside a slip-coupling 131 in chamber 88. A collar 132 is pinned to the upper end of stem 121 inside coupling 131. Coupling device 131 is secured to a short upper stem 133 which is secured to valve lever 91 by a pivoted bracket 134. The handle 91 can be lifted manually to test and free the valve. The valve stem 121, however, moves up and down during the opening and closing of valve 122 by virtue of the play in coupling 131, without corresponding movement in handle 91. Likewise, lower valve stem section 112 can move up and down slightly in response to the action of bellows 110 (below its set point) without contacting upper valve stem 121. This spacing arrangement will permit valve 122 to open in response to high pressure alone without damage to bellows 110. The length of valve stem sections 112, 121 should be adjusted to the bellows 110 so that valve stem 112 is raised to contact upper stem 121 only when the bellows-operating temperature is exceeded. Moreover, minor adjustment in the positioning of stem 121 can be affected by changing the location of the slide guide 130 and by screwing the valve member 122 and slide guide 125 up or down on the stem 121.

The valve stem 121 is also provided with a spring-loaded, pressure-responsive means. A screw-fitted lower collar 140 and a freely slidable upper collar 141 are fitted on stem 121 in chamber 84. A compression spring 142 is disposed between collars 140, 141 to exert downward pressure by contact with guide 130. The positions of collar 140 and slide guide 130 will determine the pressure exerted on valve 122. When the pressure in throat 120 exceeds the pressure exerted by spring 142, the valve member 122 will be lifted off its seat to discharge water through discharge chamber 127 and out pipe connection 20.

In operation, when the temperature of the water in jacket space 106 exceeds the operating temperature of bellows 110, the bellows will lift lower stem 112 into contact with upper stem 121 and valve 122 will be moved off its seat. The line pressure existing in jacket 106 and throat 120, meanwhile, will assist in lifting valve 122. The bellows 110, therefore, need exert only a small force to discharge overheated water from the system. This latter feature makes possible the use of a large, lightweight bellows of a less expensive construction, As in the valve of Figs. 1 to 4, the liquid in the cup-shaped bottom 150 of bellows 110 is maintained in intimate heat-exchange relation with water in jacket 106 making the bellows readily responsive to system water temperatures.

In Fig. 7, there is illustrated a means for securing bellows 110 (or bellows 38 of Fig. 1) in place in chamber 104. A thin cup-shaped piece or two strips of metal 160 are brazed to the bottom fold 161 of the bellows. The upper edge of metal piece 160 is secured to the chamber wall 96 by screws 162, 162, or by bolts, or by welding or brazing, if desired. In this manner, the bellows is firmly but flexibly held in place with its cup-shaped bottom located in cup-shaped bottom 97 of the bellows chamber 104. Accidental displacement of the bellows during handling is thereby prevented.

As shown in Figs. 5 to 7, the bellows 110 and the bellows chamber 104 is easily removed as a unit for inspection, replacement, cleaning or repair by removing nuts 103, 103 on the vent tubes 101, 101. Since the assembly merely rests on lugs 94a, 94a inside valve base 80, it may be lifted out for easy disassembly. Similarly, all of upper valve sections 81, 84 and 88 may be removed from the valve without disconnecting the base 80 from pipes 12, 13 and 14. The various flanged connections make disassembly of the valve a simple operation.

The valve of Fig. 5 thus differs from that of Fig. 1 principally by having its base and valve discharge sections located one above the other without an intervening discharge chamber and also by having an enlarged rigid valve member instead of a smaller valve member and a larger flexible diaphragm. The valves are equivalent in operation, however, in connection with water tanks and water heating boilers. The valve of Fig. 5 is usable at somewhat higher operating pressures while that of Fig. 1 is more sensitive at lower operating pressures. Both valves incorporate safety features which protect the bellows from damage. Both valves make use of line pressure to assist the bellows in operating the discharge valve. As a result, lighter, less expensive and more sensitive bellows can be utilized.

This application is a continuation-in-part of my co-pending application Serial No. 224,869, filed May 7, 1951, now abandoned.

While it will be apparent that the preferred embodiment of the invention herein disclosed is well calculated to fulfill the objects above stated, it will be appreciated that the invention is susceptible to modification, variation and change without departing from the the proper scope or fair meaning of the subjoined claims.

What is claimed is:

1. A pressure- and temperature-responsive relief valve comprising a body having in vertical arrangement at least three separate chambers, the chamber at one end being sealed out of contact with the remaining chambers and having interior chambering walls defining a water jacket surrounding an interior water-free bellows chamber, said water jacket being arranged to surround the sides and bottom of said belows chamber and having at least three water connections therein, said bellows chamber having passageways connecting with the atmosphere and having its bottom arranged in the shape of a bellows-retaining cup in intimate heat-exchange relationship with the water in said water jacket, a temperature-responsive liquid-filled bellows located in said interior chamber and having its bottom shaped to fit into said cup-shaped depression, the other end chamber having a spring-loaded pressure valve attached to a flexible membrane and a water-inlet port arranged to deliver water at full-line pressure under said membrane, the middle of said chambers having a waste-discharge port and a passageway extending to a point beneath said pressure valve and arranged to be sealed thereby, an upper valve stem section attached to said valve and said membrane and extending through said valve-containing chamber to a point in said passageway beneath said valve, and a lower valve stem section attached to said bellows and in alignment with the said first valve stem section, the second said valve stem section heaving a length adjusted to make contact with the first said valve stem section at the discharge temperature of said bellows and which will permit said bellows to freely expand and contract at temperatures below its discharge temperature.

2. A pressure- and temperature-responsive relief valve comprising a body having at least three separate chambers in vertical arrangement, and having mating flanges in mutual attachment; the chamber at one end being sealed out of contact with the remaining chambers and having at least three water connections therein, bellows chamber adapted to fit within said sealed end chamber and having a flanged edge for insertion between the flanges of said last-named sealed end chamber and the adjacent chamber, said bellows chamber being arranged to cooperate with said sealed end chamber to form an interior water-free chamber therewithin surrounded on its sides and bottom by a water jacketing space, passageways extending from the interior of said bellows chamber through said water jacketing space and said end chamber to connect with the atmosphere, the other end chamber of said three chambers having a spring-loaded pressure valve attached to a flexible membrane and a water inlet port arranged to deliver water at full-line pressure under said membrane, the middle of said three chambers having a waste-discharge port and a passageway extending to a point beneath said pressure valve and arranged to be sealed thereby, an upper valve stem section attached to said valve and said membrane and extending through said valve-containing chamber to a point in said passageway beneath said valve, and a lower valve stem section attached to said bellows and in alignment with said upper valve stem section, the said lower valve stem section having a length adjusted to make contact with said upper valve stem section at the discharge temperature of said bellows and to permit said bellows to expand and contract freely at temperatures below its discharge temperature.

3. A pressure- and temperature-responsive relief valve comprising a body having a plurality of separate chambers in vertical arrangement, one of said chambers containing at least three openings for connection with a water system, a sealed water-free chamber located within said last-named chamber and adapted to define therewith an outer water jacketing space surrounding said water-free chamber, said first-named chamber having inner lug-like projections for supporting said interior water-free chamber, said interior water-free chamber having passageways projecting through said first-named chamber and connecting with the atmosphere and a portion of its wall in the bottom thereof in intimate heat-exchange relationship with said water jacket and shaped in the form of a bellows-retaining cup, a temperature-responsive, liquid-filled bellows located in said interior water-free chamber and having a cup-shaped base fitted into said bellows-retaining cup, another of said vertical chambers having located therein a spring-loaded pressure valve and a water inlet passageway arranged to deliver water at full-line pressure under said valve, said last named passageway communicating with said water jacket of said first-named vertical chamber, the last-named valve-containing chamber having a discharge passageway connecting with said valve, a first valve stem section attached to said bellows and extending to a position in said passageway beneath said valve, and a second valve stem section in alignment with said first valve stem section and attached to a spring-loaded, pressure-exerting means, the second said valve stem section having a length adjusted to make contact with said first valve stem section at the discharge temperature of said bellows and which permits said bellows to expand and contract freely at temperatures below its discharge temperatures.

References Cited in the file of this patent

UNITED STATES PATENTS

| | | |
|---|---|---|
| 2,008,568 | Snavely | July 16, 1935 |
| 2,165,171 | Zinkil | July 4, 1939 |
| 2,223,115 | McDermott | Nov. 26, 1940 |
| 2,268,359 | Tustin | Dec. 30, 1941 |
| 2,351,190 | Carlson | June 13, 1944 |